(12) United States Patent
Gray

(10) Patent No.: US 6,270,681 B1
(45) Date of Patent: Aug. 7, 2001

(54) AERATION POND WITH OXYGEN RECYCLING

(75) Inventor: Steven P. Gray, St. Louis, MO (US)

(73) Assignee: MG Industries, Malvern, PA (US)

( * ) Notice: Subject to any disclaimer, the term of this patent is extended or adjusted under 35 U.S.C. 154(b) by 0 days.

(21) Appl. No.: 09/303,195

(22) Filed: Apr. 30, 1999

(51) Int. Cl.[7] .................................................. C02F 7/00
(52) U.S. Cl. .................... 210/747; 210/758; 210/170; 210/220; 210/242.2; 95/204
(58) Field of Search .................................. 210/747, 758, 210/620, 627, 170, 198.1, 242.1, 242.2, 194, 220; 261/121.1, 124, 123, 30; 95/204, 258; 417/151

(56) References Cited

U.S. PATENT DOCUMENTS

| | | | | |
|---|---|---|---|---|
| 3,109,288 | * | 11/1963 | Gross | 261/121.1 |
| 3,320,928 | * | 5/1967 | Smith . | |
| 3,635,592 | * | 1/1972 | Kolfertz . | |
| 3,911,064 | * | 10/1975 | McWhirter et al. | 210/220 |
| 4,096,215 | * | 6/1978 | Albrecht | 210/221.2 |
| 4,324,655 | | 4/1982 | Muskat | 210/96.1 |
| 4,483,154 | * | 11/1984 | Smeal | 62/305 |
| 4,486,310 | * | 12/1984 | Thornton | 210/604 |
| 5,330,576 | * | 7/1994 | Clauditz | 118/688 |
| 5,628,623 | * | 5/1997 | Skaggs | 417/151 |

FOREIGN PATENT DOCUMENTS

| | | | |
|---|---|---|---|
| 2649126 | * | 5/1978 | (DE) . |
| 583932 | | 2/1994 | (EP) . |
| 59139997 | | 11/1984 | (JP) . |

* cited by examiner

Primary Examiner—David A. Simmons
Assistant Examiner—Frank M. Lawrence
(74) Attorney, Agent, or Firm—William H. Eilberg

(57) ABSTRACT

Water in an aeration pond is treated with substantially pure oxygen. The oxygen originates from a pressurized oxygen supply, and is conducted through a conduit to the bottom of the pond. Perforations located around the perimeter and along the length of the conduit allow oxygen to bubble through the pond. A hood disposed to float above the surface of the pond collects unreacted oxygen, and this oxygen flows, through a suitable gas line, back to the original conduit. The unreacted oxygen mixes with fresh oxygen from the pressurized source, and is recycled through the pond. In one embodiment, before mixing with fresh oxygen, the recovered oxygen is pressurized by a double-diaphragm pump which is operated by pressure from the oxygen supply. The pressurized oxygen is the sole source of motive force for moving gas through the system. The rate of gas flow through the system is controlled by adjusting the supply pressure, through the use of a control valve. The present invention substantially improves the efficiency of water treatment processes, by dramatically reducing the amount of wasted oxygen.

20 Claims, 1 Drawing Sheet

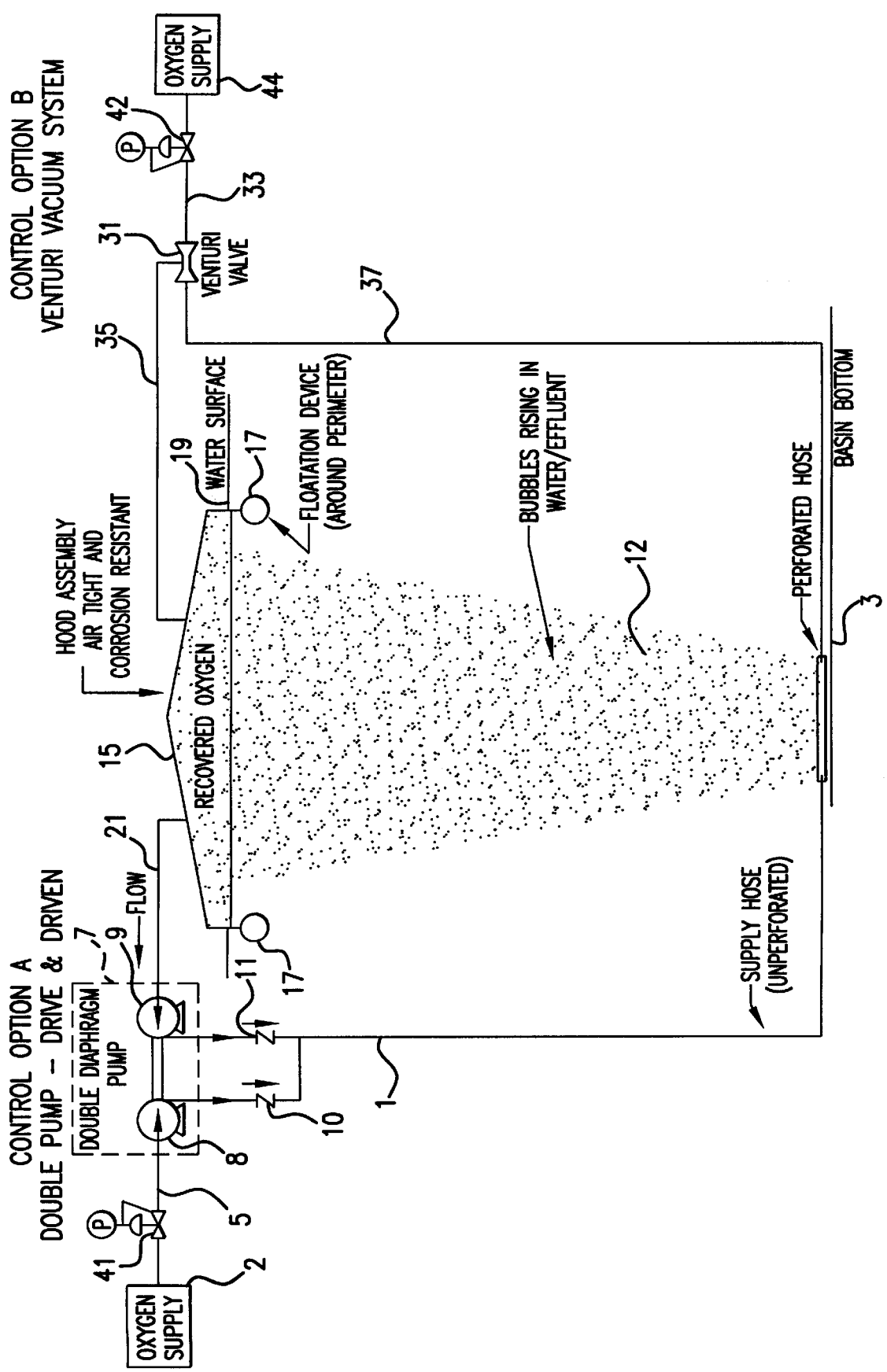

AERATION POND WITH OXYGEN RECYCLING

BACKGROUND OF THE INVENTION

The present invention relates to the field of water treatment, and provides a method and apparatus which improves the efficiency of an aeration pond or basin.

Waste water is treated by exposing the water to oxygen. Naturally-occurring organisms in the water need oxygen to enable them to consume the waste. If there is insufficient oxygen in the water, the organisms will tend to come to the surface of the water, to obtain the needed oxygen. This migration of the organisms causes odor in a water treatment facility.

To provide oxygen which is reasonably well dispersed throughout the water in a treatment pond, it has been known to provide oxygen at the bottom of the pond, and allow it to form bubbles which rise through the pond. In the latter system, a source of oxygen is conveyed to a perforated hose, located at or near the bottom of the pond, and the oxygen leaks through perforations located around the perimeter and along the length of the hose. The result is a stream of small bubbles ranging in diameter from about 1–5 mm. As the bubbles of pure oxygen rise in the water, they dissolve in the water, and oxygen is transferred to the organisms in the pond.

The transfer of oxygen in the manner described above is not perfectly efficient. The percentage of oxygen which is transferred depends on the amount of dissolved oxygen in the water, the biological oxygen demand (BOD) of the organisms, the chemical oxygen demand (COD), which is the requirement associated with specific chemicals such as hydrogen sulfide, and on other factors which will be apparent to those skilled in the art. In general, there will always be unreacted oxygen bubbles which reach the surface. The unreacted bubbles may constitute 10–50 percent of the original oxygen supplied. In systems of the prior art, this oxygen has been wasted, as it simply vents to the air above the surface of the pond.

It has been known that the efficiency of oxygen transfer is also directly related to the depth of the water. The deeper the water, the more time for reaction, and the greater the efficiency of oxygen transfer. Still other factors, such as the oxygen saturation point (Cs) for a given water temperature, bubble velocity, bubble surface area, and interfacial boundaries, also contribute to the overall efficiency.

Most aeration basins do not employ pure oxygen to aerate the water. The most common method, in the prior art, for aerating waste water, is to use motor-driven aeration systems to force circulation of the water and thus increase its contact area with the surrounding air. These devices take many different forms, such as downdraft pumps, which force surface water to the bottom, updraft pumps, which produce a small fountain, paddle wheels, and other similar devices. Since air contains only about 21% oxygen, the transfer efficiency of these devices is comparatively low. The initial investment in equipment, and the ongoing expenses of electricity and maintenance for these devices makes their overall cost higher than that of a system which uses pure oxygen. Using pure oxygen to treat waste water also offers the advantage that one can treat a larger volume of water for a basin of a given size.

Another prior art device provides a custom-fitted fabric cover which sits on the surface of an aeration pond. The cover is relatively air-tight, and is intended to prevent obnoxious odors from being discharged. Such a cover is relatively expensive, and installation is difficult. In some applications, oxygen or compressed air can be pumped under the canopy to supply additional oxygen to the process. In the latter case, the transfer of dissolved oxygen occurs only at the surface of the water.

It has also been known to combine the above-described fabric cover with additional devices, such as those described earlier, which circulate, spray, or otherwise increase the effective surface area of the water, and thus increase the transfer efficiency. Also, the noxious odors can be reduced or eliminated by scrubbing the gas released from the pond, using a known supplemental process.

It has also been known, in the prior art, to capture unreacted bubbles and to recycle them. But the only known system for doing so employs a motor-driven turbine, similar to one of the devices mentioned above, which creates a swirling downdraft in the water, trapping the oxygen and driving it down. The latter system has the disadvantages that it requires electricity for use, it requires maintenance, and it is expensive to purchase and install.

The present invention provides a method and apparatus which substantially reduces the amount of wasted oxygen, and which therefore effectively enhances the efficiency of a water treatment facility.

SUMMARY OF THE INVENTION

The present invention works with an aeration pond or basin, in which an external supply of pressurized oxygen is supplied to the pond. A perforated hose carries the oxygen to the bottom of the pond, and the oxygen flows out of the hose in the form of bubbles.

The present invention includes a hood, configured to float on the surface of the aeration pond. The hood collects unreacted oxygen which emerges from the surface of the pond. This recovered oxygen flows into a conduit which connects with the supply hose, so that the oxygen collected by the hood is returned to the bottom of the pond. Thus, the unreacted oxygen is recycled, improving the efficiency of the treatment facility.

The conduit which returns the collected oxygen to the pond is connected either to a double diaphragm pump, or to a venturi. The pump or the venturi performs the function of mixing recovered oxygen with fresh oxygen from the external source, so that a mixture of both will flow through the supply hose.

The pressurized oxygen comprises the only source of motive force in the apparatus of the present invention. The diaphragm pump or venturi are purely passive devices. In the case of the double diaphragm pump, the pressurized oxygen drives one half of the pump, which in turn drives the other half of the pump, thereby compressing the oxygen being recycled.

The hood is preferably held in position by cables extending along the surface of the pond. The hood, in general, will not cover the entire surface of the pond, but a plurality of hoods could be used, side-by-side, to cover an area greater than that covered by one hood. The greater the proportion of the surface that is covered, the greater the amount of recycling that is possible.

The present invention therefore has the primary object of providing an improved method and apparatus of water treatment.

The invention has the further object of providing an aeration pond which uses oxygen efficiently.

The invention has the further object of providing an aeration pond as described above, wherein the motive force for oxygen flow comes solely from an incoming pressurized stream.

The invention has the further object of reducing the cost of operating an aeration pond.

The invention has the further object of reducing the amount of oxygen wasted in a water treatment process.

The invention has the further object of reducing odors emanating from aeration ponds, by improving the overall efficiency with which oxygen is distributed in such ponds.

The reader skilled in the art will recognize other objects and advantages of the present invention, from a reading of the following brief description of the drawings, the detailed description of the invention, and the appended claims.

BRIEF DESCRIPTION OF THE DRAWINGS

The FIGURE provides a schematic diagram of the aeration pond of the present invention, showing two alternative means for recycling recovered oxygen.

DETAILED DESCRIPTION OF THE INVENTION

The FIGURE shows the aeration pond or basin of the present invention. For convenience of illustration, two alternative means of recycling oxygen are shown in the same figure. These alternatives include the double diaphragm pump, shown on the left-hand side of the figure, and a venturi valve, shown on the right-hand side.

Assume first that the double diaphragm pump is being used. Pressurized oxygen from oxygen supply 2 flows through supply line 5, into pump 8 of double diaphragm pump assembly 7, through check valve 10, and into supply hose 1. The end of the supply hose is positioned at or near the bottom 3 of the aeration pond. The end of the supply hose, which can be made of EPDM (ethylene-propylene-diene-methylene) rubber, is perforated, so that oxygen flows out of the hose in the form of bubbles 12, which rise through the pond. The size of the holes is chosen so that the bubbles are about 1–5 mm in diameter. The oxygen flow rate is approximately proportional to the pressure supplied to the hose.

Hood 15 is supported by flotation devices 17 on the surface 19 of the pond. The hood is preferably made of an airtight and corrosion-resistant material. The hood could be constructed like a tent, i.e. having tubing which supports a flexible canopy. The canopy could be constructed of a woven fabric, or other material, or it could be made of metal. Thus, the hood includes a portion which is located above the surface of the pond, so as to define a space within which the unreacted oxygen can collect.

As the bubbles of pure oxygen rise in the water, oxygen is transferred to the organisms in the water, in the form of dissolved oxygen. The amount of oxygen transferred depends on the biological oxygen demand (BOD), the time in contact, the oxygen saturation capacity of the water, and other related factors.

Those bubbles which are not reacted rise to the surface, and a majority of such unreacted bubbles will emerge under the hood. The fact that the hood is floating on the surface of the water, and the compressibility of gaseous oxygen, provide some degree of variable reservoir capacity.

Conduit 21 carries the recovered oxygen to pump 9 of double diaphragm pump assembly 7. The recovered oxygen flows through check valve 11, and is mixed with oxygen from the supply line, as it re-enters the supply hose 1.

The hood will clearly not recover every bubble of unreacted oxygen. However, the bubbles tend to rise vertically, and the hood is likely to recover most of the unreacted bubbles which are located immediately below the hood. The hood is not intended to cover the entire pond. If greater coverage is needed, one can use a plurality of such hoods. Each hood and its associated equipment comprises one module, and each such module may typically cover an area of about 10×20 feet. It is believed that the hood can recover about 80–90% of the bubbles which are released directly under the hood.

The hood is preferably held in position by cables (not shown) which may extend from one side of the pond to the other. Alternatively, the hood may be attached to a submerged or floating frame system (not shown) which is used to position and hold the submerged, perforated hoses to the bottom of the basin. In this case, the mooring cables or anchoring system would not be necessary.

The double diaphragm pump receives its motive force from the pressurized oxygen stream entering from the oxygen supply. There is no other source of motive force in the present invention. The incoming pressurized stream drives pump 8, which drives pump 9, which compresses the recovered oxygen before it is mixed with the incoming stream of fresh oxygen. The ratio of fresh oxygen to recycled oxygen is directly proportional to the overall efficiency of oxygen transfer.

The double diaphragm pump can be replaced by a venturi valve. The latter alternative is shown on the right-hand side of the figure. Venturi valve 31 is connected to receive pressurized oxygen, from supply 44, through supply line 33, which corresponds to supply line 5. The venturi valve also receives collected oxygen through conduit 35, which corresponds to conduit 21. The venturi valve creates a vacuum which draws the unreacted oxygen from conduit 35, so that it can be used again. Fresh oxygen and recycled oxygen become mixed in the venturi valve, and the mixture enters supply hose 37, which corresponds with supply hose 1. In the preferred embodiment, one uses either the double diaphragm pump or the venturi valve, but not both.

In both embodiments, the only source of motive force is the pressure of the oxygen. The pressure differential between the supply pressure and hose pressure is what forces gas through the system. Pure gaseous oxygen is introduced into the system at about 100 psig. The oxygen is provided to the supply side of the double diaphragm pump or venturi inlet. The oxygen emerges from the pump or venturi at a proportionally lower pressure, equal to the pressure in the perforated hose. The fresh oxygen and recycled oxygen are recombined and reach equilibrium pressure. Proper sizing of the venturi and/or pump will determine the mixing proportions. These proportions are believed to be constant regardless of the desired flow to the hose.

In the process of the present invention, it is desirable to be able to adjust the flow of oxygen to the water. By adjusting the flow, a continuous dissolved oxygen level can be maintained regardless of demand conditions, thereby saving the cost of surplus oxygen. A key advantage of the recycling system is its variable rate capacity. When one decreases the inlet pressure to the pump or venturi system, the system will slow down, thereby lowering the equilibrium point of pressure at the perforated hose. A regulator or control valve, illustrated as 41 and 42 in the two embodiments represented in the figure, is used to adjust the supply pressure. A continuous dissolved oxygen monitor (not shown) can be added as an option to provide automatic regulation of the final dissolved oxygen level.

The material used to make the hood, and to make the pump and/or venturi should be corrosion resistant and compatible with oxygen. Otherwise, the invention is not limited by choice of materials.

The apparatus of the present invention is preferably anchored or secured within a treatment pond or basin. Anchoring may be done by connecting a corrosion-resistant cable to an adjoining shore, or by using submerged weights, or fixed vertical poles contacting the bottom of the basin. Most applications will require a plurality of modules, to cover a pond having a large area.

The invention can be modified in various ways. The shape and size of the hood can be changed. The means for anchoring the hood in its place can be modified. Substitutes for the double diaphragm pump or venturi valve could be used. These and other modifications, which will be apparent to the reader skilled in the art, should be considered within the spirit and scope of the following claims.

What is claimed is:

1. A method of treating water, comprising the steps of:
   a) bubbling oxygen through water to be treated,
   b) recovering unreacted oxygen from the water,
   c) mixing the unreacted oxygen recovered in step (b) with fresh oxygen from a source of pressurized oxygen, and
   d) directing the mixture formed in step (c) through the water to be treated,
      wherein the bubbling and directing steps are performed by using the pressurized oxygen as the sole source of motive force,
      wherein the bubbling step comprises simultaneously dispensing bubbles of oxygen from a plurality of openings in a conduit, wherein all of said openings are disposed below a hood located above the water,
      and wherein oxygen is made to flow continuously without passing through any oxygen concentration measuring means.

2. A method of treating water, comprising:
   a) conveying pressurized oxygen from a source to a conduit which is connected to a bottom of an aeration pond, and bubbling said pressurized oxygen through water in the pond,
   b) collecting unreacted oxygen in a hood disposed above a surface of the pond,
   c) mixing unreacted oxygen collected from the hood with fresh oxygen obtained from the source of pressurized oxygen, and
   d) conducting the mixture formed in step (c) to the bottom of the pond, wherein the mixture is bubbled through the water,
      wherein the conveying and conducting steps are performed by using the pressurized oxygen as the sole source of motive force,
      wherein the bubbling step comprises simultaneously dispensing bubbles of oxygen from a plurality of openings in said conduit, wherein all of said openings are disposed below said hood,
      and wherein oxygen is made to flow continuously without passing through any oxygen concentration measuring means.

3. The method of claim 2, wherein steps (a) through (d) are performed continuously.

4. The method of claim 2, wherein the mixing step is preceded by the step of compressing unreacted oxygen collected from the hood.

5. The method of claim 2, further comprising the step of controlling a pressure of incoming pressurized oxygen, wherein said controlling step controls a rate of flow through the pond.

6. A method of treating water, comprising:
   a) conveying pressurized oxygen from a source to a conduit which is connected to a bottom of an aeration pond, and bubbling said pressurized oxygen through water in the pond,
   b) collecting unreacted oxygen in a hood disposed above a surface of the pond,
   c) mixing unreacted oxygen collected from the hood with fresh oxygen obtained from the source of pressurized oxygen, and
   d) conducting the mixture formed in step (c) to the bottom of the pond, wherein the mixture is bubbled through the water,
      wherein the conduit has a plurality of openings at the bottom of the pond, all of said openings being disposed below said hood, wherein the conveying step includes simultaneously dispensing bubbles of oxygen from said plurality of openings,
      and wherein oxygen is made to flow continuously without passing through any oxygen concentration measuring means.

7. In an aeration system, the system including a pond, the pond having a surface and a bottom, the pond including means for dispensing oxygen in a vicinity of the bottom of the pond, the improvement comprising a hood which floats on the surface, the hood having means for collecting unreacted oxygen emerging from the pond, and means for fluidly connecting the collecting means to the dispensing means, wherein the dispensing means comprises a hose having a plurality of openings, all of said openings being disposed below said hood, wherein the hose comprises means for simultaneously dispensing bubbles of oxygen from said plurality of openings, wherein oxygen is recycled after having been dispensed into the pond, and wherein oxygen flows continuously through the system, wherein the system is free of any oxygen concentration measuring means.

8. The improvement of claim 7, wherein the openings are sized such that the bubbles of oxygen have a diameter of about 1–5 mm.

9. Apparatus for treating water by exposing the water to oxygen, the apparatus comprising:
   a) a hood connected to a float means, the float means comprising means for enabling the hood to be positioned above a surface of an aeration pond, and to float on said surface,
   b) a supply of pressurized oxygen, the oxygen supply being connected to a perforated conduit which is sufficiently long to deliver oxygen to a bottom of an aeration pond, wherein the conduit has a plurality of openings, all of said openings being disposed below said hood, wherein the hose comprises means for simultaneously dispensing bubbles of oxygen from said plurality of openings, and
   c) means for recovering unreacted oxygen in the hood and for conveying the unreacted oxygen to said perforated conduit, wherein the unreacted oxygen becomes mixed with oxygen from said oxygen supply,
      and wherein oxygen is recycled after having been dispensed into the pond, and wherein oxygen flows continuously through the apparatus, wherein the apparatus is free of any oxygen concentration measuring means.

10. In an aeration system, the system including a pond, the pond having a surface and a bottom, the pond including means for dispensing oxygen in a vicinity of the bottom of the pond, the improvement comprising a hood which floats on the surface, the hood having means for collecting unreacted oxygen emerging from the pond, and means for fluidly connecting the collecting means to the dispensing means, wherein oxygen is recycled after having been dispensed into the pond, wherein the dispensing means is connected to a source of pressurized oxygen, and wherein pressurized oxygen from said source comprises the sole means for recycling oxygen through the pond, wherein the dispensing means comprises a hose having a plurality of openings, all of said openings being disposed below said hood, wherein the hose comprises means for simultaneously dispensing bubbles of oxygen from said plurality of openings, and wherein oxygen flows continuously through the system, wherein the system is free of any oxygen concentration measuring means.

11. The improvement of claim 10, wherein the openings are sized such that the bubbles of oxygen have a diameter of about 1–5 mm.

12. The improvement of claim 10, wherein the connecting means includes a venturi valve.

13. The improvement of claim 10, wherein the connecting means includes an air driven pump.

14. The improvement of claim 10, wherein the pressurized oxygen passes through a regulator valve before reaching the dispensing means.

15. The improvement of claim 13, wherein the pump comprises a double diaphragm pump, and wherein the pump includes a first portion which is driven by incoming pressurized oxygen, and a second portion which is driven by the first portion, and wherein the second portion is connected to compress recycled oxygen.

16. The improvement of claim 10, wherein at least a portion of the hood is disposed above the surface of the pond.

17. Apparatus for treating water by exposing the water to oxygen, the apparatus comprising:

a) a hood connected to a float means, the float means comprising means for enabling the hood to be positioned above a surface of an aeration pond, and to float on said surface, b) a supply of pressurized oxygen, the oxygen supply being connected to a perforated conduit which is sufficiently long to deliver oxygen to a bottom of an aeration pond, and c) means for recovering unreacted oxygen in the hood and for conveying the unreacted oxygen to said perforated conduit, wherein the unreacted oxygen becomes mixed with oxygen from said oxygen supply, wherein the supply of pressurized oxygen comprises the sole means for conveying oxygen through the apparatus, wherein the perforated conduit has a plurality of openings, all of said openings being disposed below said hood, wherein the hose comprises means for simultaneously dispensing bubbles of oxygen from said plurality of openings, and wherein oxygen flows continuously through the system, wherein the system is free of any oxygen concentration measuring means.

18. The apparatus of claim 17, further comprising a pump, the pump being driven by the pressurized oxygen supply, the pump also comprising means for compressing unreacted oxygen collected from the hood, the pump being fluidly connected to said perforated conduit.

19. The apparatus of claim 17, further comprising a venturi valve, the venturi valve being connected to the pressurized oxygen supply and to the hood, wherein the venturi valve comprises means for mixing oxygen from the pressurized oxygen supply and oxygen collected from the hood.

20. The improvement of claim 17, wherein the openings are sized such that the bubbles of oxygen have a diameter of about 1–5 mm.

* * * * *